L. HEISER.
MACHINE FOR MIXING, KNEADING, MASHING, COOKING, OR CHOPPING SUBSTANCES.
APPLICATION FILED OCT. 19, 1921.
1,430,012.
Patented Sept. 26, 1922.
3 SHEETS—SHEET 1.
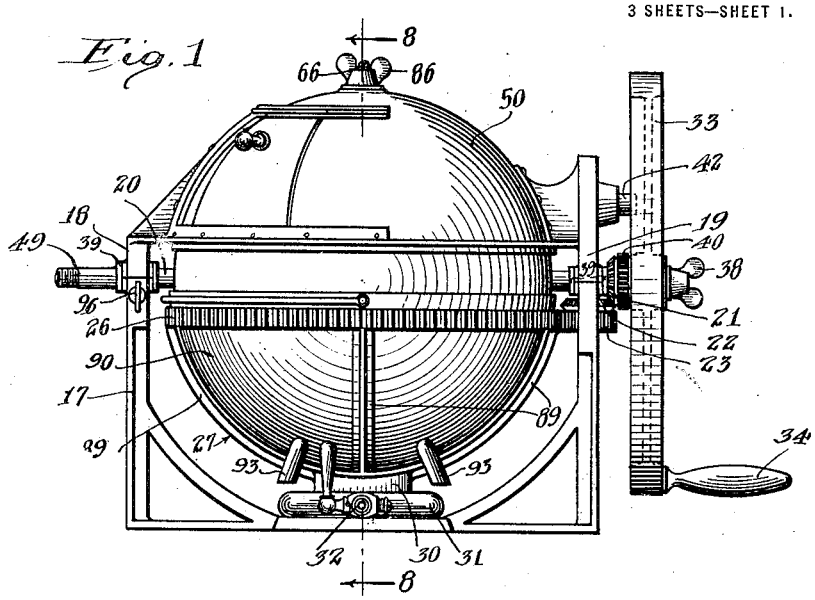
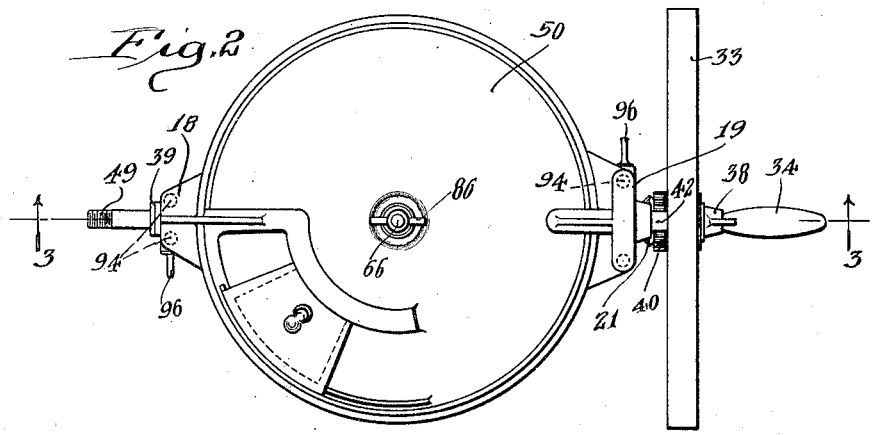
Inventor
Lucien Heiser
By Lyon & Lyon attys

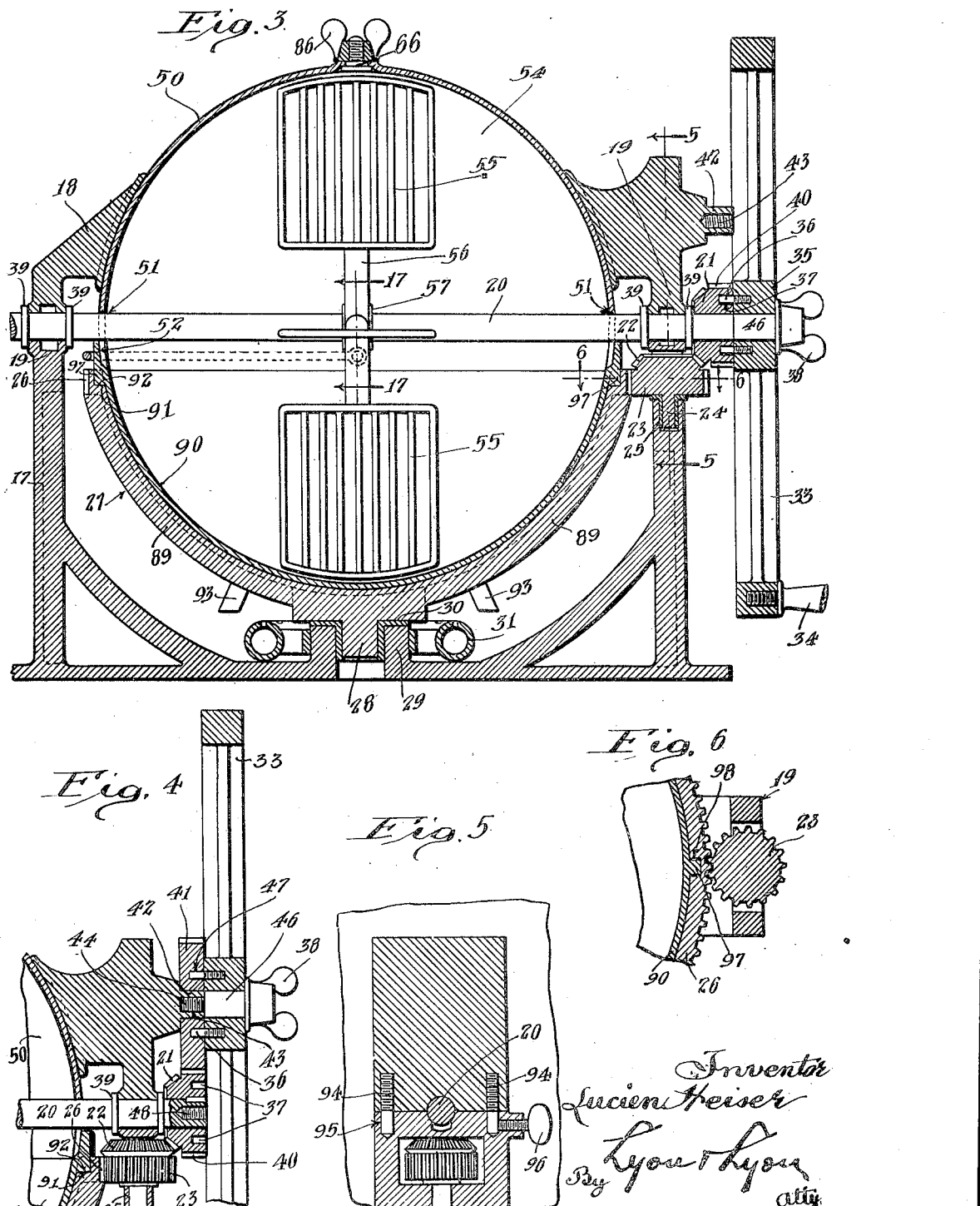

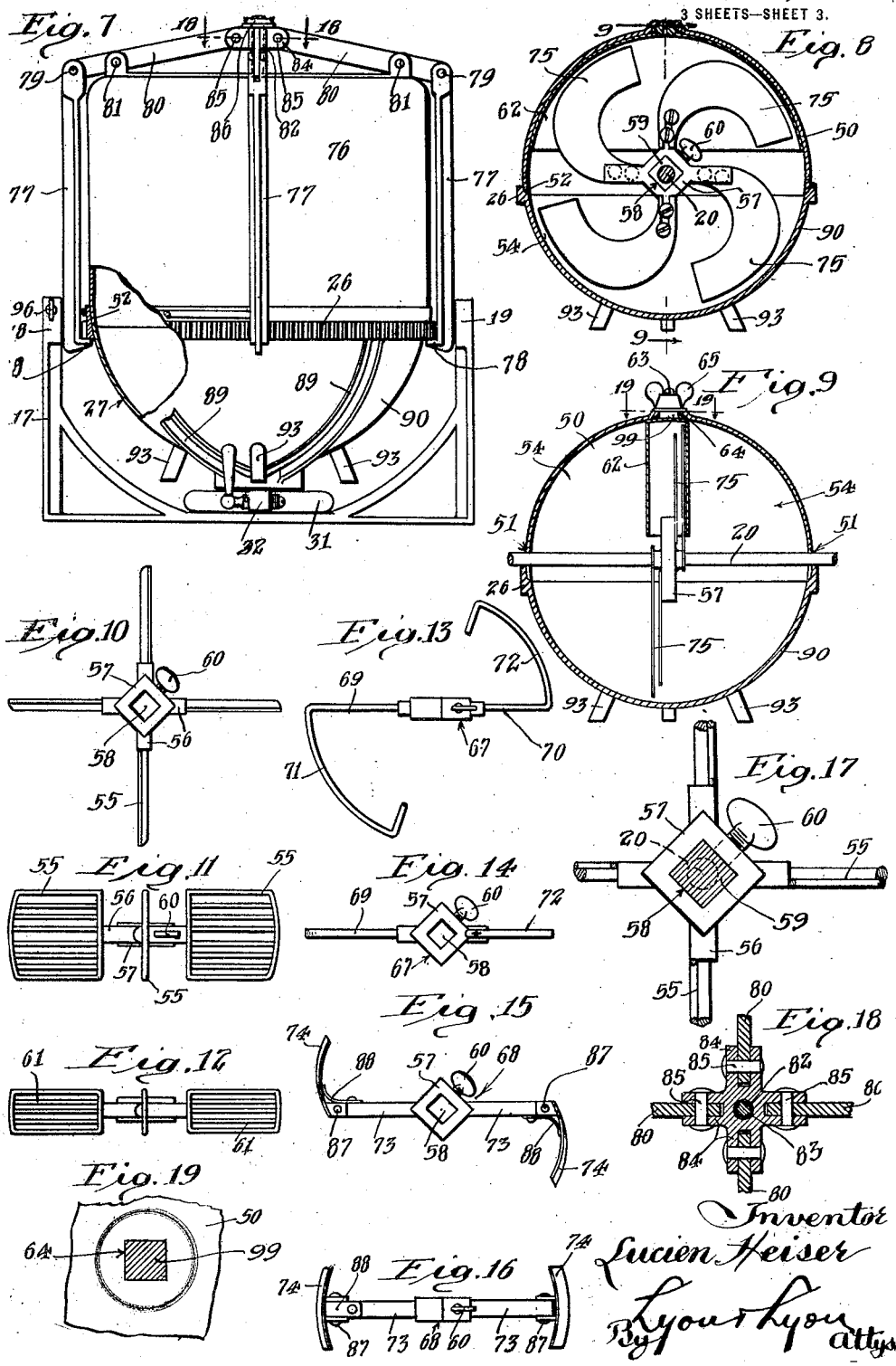

Patented Sept. 26, 1922.

1,430,012

UNITED STATES PATENT OFFICE.

LUCIEN HEISER, OF LOS ANGELES, CALIFORNIA.

MACHINE FOR MIXING, KNEADING, MASHING, COOKING, OR CHOPPING SUBSTANCES.

Application filed October 19, 1921. Serial No. 508,710.

*To all whom it may concern:*

Be it known that I, LUCIEN HEISER, a citizen of the United States, residing at Los Angeles, in the county of Los Angeles and State of California, have invented a new and useful Machine for Mixing, Kneading, Mashing, Cooking, or Chopping Substances, of which the following is a specification.

This invention relates to a machine capable of use for performing various operations, more especially operations employed in the preparation of food. The machine can be used for mixing, kneading, mashing, cooking or chopping the substances placed therein, and an object of the invention is to produce a machine of this type having high efficiency in performing the operations for which it is designed.

An important object of the invention is to provide for turning of the receptacle and the mixing, kneading, mashing, stirring or chopping instrumentalities therein in paths or planes lying substantially at right angles to each other.

The accompanying drawings illustrate the invention:

Figure 1 is a front elevation of a machine embodying the invention.

Figure 2 is a plan view of Figure 1.

Figure 3 is an enlarged sectional elevation on line indicated by 3—3, Figure 2.

Figure 4 is a fragmental elevation of the driving mechanism, the flywheel being mounted differently than in the preceding views and two extra gears being shown between the flywheel and the drive shaft.

Figure 5 is an enlarged fragmental sectional detail on line indicated by 5—5, Figure 3.

Figure 6 is a fragmental plan section on line indicated by 6—6, Figure 3.

Figure 7 is a front elevation, partly in section, of the machine, with a different cover substituted for that shown in Figures 1 to 3, the shaft and its driving mechanism being omitted.

Figure 8 is a reduced vertical section of the container and cover on line 8—8, Figure 1, the chopping blades being shown in place in said container.

Figure 9 is a sectional elevation on line 9—9, Figure 8.

Figure 10 is a reduced edge view of the mixing and mashing element shown in Figure 3.

Figure 11 is a plan view of Figure 10.

Figure 12 is a plan view of the beating or whipping element similar to the element in Figure 11, excepting that the grid is narrower so as to fit within the case shown in Figures 8 and 9.

Figure 13 is a plan view of the mixing and kneading element.

Figure 14 is an edge view of Figure 13.

Figure 15 is an edge view of the stirring element.

Figure 16 is a plan view of Figure 15.

Figure 17 is an enlarged fragmental section on the line indicated by 17—17 Fig. 3.

Fig. 18 is an enlarged fragmental plan section on the line indicated by 18—18, Fig. 7.

Fig. 19 is an enlarged fragmental detail partly in section on the line indicated by 19—19, Fig. 9.

There is provided a suitable stand or frame 17 which may be secured by any desired means, not shown, to a table or other supporting structure. The frame is provided at opposite sides with bearings 18, 19 which, in this instance, are split; the frame 17 being formed in sections with the joint at the bearings 18, 19 so that the upper section can be lifted from the lower section. Journaled in the bearings 18, 19 is a shaft 20 and mounted on said shaft adjacent the outer end of the bearing 19 is a bevel gear 21 meshing with a bevel gear 22 which is secured to a spur gear 23, in this instance formed integral with the gear 22. From the gear 23 projects a stub shaft 24 which is journaled in a bearing 25 formed in the lower section of the frame 17.

The gear 23 meshes with the ring spur gear 26 of a semi-spherical bowl 27. The bowl 27 is provided at its center, with a downwardly projecting stub shaft 28 which is journaled in a bearing 29 formed in the lower section of the frame 17. A shoulder 30 on the shaft 28 rests upon the upper end of the bearing to support the bowl. A plain bushed bearing is shown in the drawings, but it is understood that an antifriction bearing may be employed, if desired.

From the foregoing it is clear that the bowl 27 may be rotated horizontally by operation of the shaft 20.

Fitting and surrounding the bearing 29 is an annular burner 31 adapted to burn liquid or gaseous fuel for heating the bowl 27, The burner 31 is provided with a fuel valve 32 clearly shown in Fig. 1 of the drawings.

In Figs. 1 and 3 of the drawings, the shaft 20 is shown provided at one end with a fly wheel 33 having a handle 34 for turning it. The hub 35 of the fly wheel is provided with projecting studs 36 which seat in sockets 37 formed in the outer face of the hub of the gear 21, to prevent relative turning between the flywheel and said gear. A thumb nut 38 is screwed on the end of the shaft 20 against the flywheel 33 to hold the flywheel in position with the studs 36 in the sockets. End thrust of the shaft 20 is prevented by suitable thrust collars 39 on the shaft at opposite ends of the bearings 18, 19.

In some instances, it may be desirable to drive the shaft at a comparatively high rate of speed without requiring too rapid manually effected rotation of the flywheel 33, and I have therefore provided, see Fig. 4, a spur pinion 40 connected with or formed integral with the pinion 21 and adapted to mesh with a spur gear 41 detachably mounted and journaled on a stud 42, which projects laterally from the upper section of the frame 17. This stud 42 is provided with an axial screw-threaded socket 43 to receive the screw-threaded portion 44 of a detachable section 46 of the shaft 20. In Fig. 4 the fly wheel 33 is shown mounted on the shaft section 46, and the studs 36 are seated in sockets 47 formed in the outer face of the gear 41, so that turning of the flywheel 33 will rotate the gear 41, which in turn operates the pinion 40 to turn the gear 21 and shaft 20. When the fly wheel 33 is mounted to turn the gear 21 direct, as in Fig. 3, the screw-threaded portion 44 of the shaft section 46 is seated in a screw-threaded socket 48 formed in the adjacent end of the other section of the shaft 20. It will of course be understood that the shaft 20 may be operated by any suitable power, either direct or through suitable gearing, and that the construction shown in the drawings for hand-operation is merely typical and may be employed for small units used for domestic purposes.

The end portion 49 of the shaft 20, adjacent the bearing 18, is screw-threaded and is thus adapted to receive any attachment, provided with a screw-threaded socket, to which it is desired to impart rotary motion. Such attachment, for example, may be a grindstone, reamer for extracting the pulp and juice from lemons and oranges, or other device of like nature.

To the upper section of the frame 17 is secured a semi-spherical cover 50 which is provided at its rim with notches 51 to accommodate the shaft 20 so as to fit closely half-way around said shaft. The rim or edge of the cover 50 seats within an annular flange 52 of the bowl 27. Though stuffing boxes are not shown for the shaft 20, it is understood that such may be employed, if deemed desirable, to prevent the contents of the bowl from leaking through the notches 51.

The bowl 27 and cover 50, thus together form a spherical chamber 54, and various instrumentalities may be mounted on the shaft 20 within the chamber 54 for operating upon the contents of the bowl. In Figs. 3, 10 and 11 I have shown a beating, stirring and mashing element comprising a plurality of grids 55 mounted on radial arms 56 projecting from a hub 57 containing a square hole 58 to fit upon the square portion 59 of the shaft 20. A thumb screw 60 in the hub 57 is employed for detachably securing the hub to the shaft.

From the foregoing it is clear that in operation turning of the flywheel 33 will effect rotation of the bowl 27 and of the grids 55 in paths or planes lying at right angles to each other.

In Fig. 12 I have shown a beating or whipping unit of a construction similar to that shown in Figs. 10 and 11, excepting that the grid 61 is narrower, and this unit is especially serviceable in mixing together and beating or whipping the ingredients of mayonnaise salad dressing. When the grids 61 are employed, it is preferable to employ at the same time a case 62 which is mounted within the cover 50 and secured thereto. The case 62 is substantially semi-circular in a plane transverse of the shaft 20 so as to substantially fit the inner face of the cover 50, but in cross-section the width of the case 62 is less than the inside diameter of the chamber 54. This case 62 is clearly shown in Figs. 8 and 9 of the drawings. To secure the case 62 to the cover 50, said case is provided on its top with a screw-threaded stud 63 adapted to project through a hole 64 in the cover and to receive a wing nut 65 which is screwed down against the cover and is clearly shown in Fig. 9. When the case 62 is not employed, the hole 64 is closed by a plug 66 shown in Fig. 3.

Another instrumentality in the form of a mixing and kneading element is indicated at 67 in Figs. 13 and 14, and a still different instrumentality in the form of a stirring paddle is shown at 68 in Figs. 15 and 16. The unit 67 may be used, for example, in making dough and it comprises radial arms 69 and 70 of different lengths and joined to said arms arcuate members 71, 72, respectively. By having the arms 69, 70 of different lengths, the members 71, 72 are caused to rotate in different paths, or planes. The unit 68 comprises radial arms 73 and blades or paddles 74 pivoted at 87 to said arms, and this unit is useful in stirring candy and preserves. Preferably springs 88 are secured at one end to the arms 73 and bear against the inner faces of the paddles 74 to yieldingly hold the paddles against the inner face of the chamber 54.

In Figs. 8 and 9 a still different unit is shown mounted on the shaft 20. This unit comprises a plurality of curved knives 75 offset from one another along the shaft so as to rotate in different planes. In using the knives 75 it is preferable to also employ the case 62 above described, and the case and knives are so constructed that two of the knives fit close to the side walls of the case, as clearly shown in Fig. 9. The case 62 is open at its bottom and is constructed of very thin sheet metal so that the edges of the case will be naturally comparatively sharp, and said edges may be ground sharper if desired. Another reason for making the case 62 of sheet metal is that the knives 75 can be constructed to almost touch the wall of the chamber 54 so as to enhance the cutting and chopping effect of the knives. The knives 75 will be employed for cutting or chopping substances, such, for example, as meat.

When it is desired to cook substances that do not require stirring, the upper section of the frame 17, together with the cover 50 will be removed. Then the larger cover 76 shown in Fig. 7 will be employed in place of the cover 50. This cover 76 fits within the flange 52 and is of cylindrical construction. Means are provided for tightly clamping the cover 76 to the bowl 27 so that, if desired, pressure cooking may be effected. The clamping means which I have devised comprise a plurality of jaws 77 having inturned ends 78 to catch beneath the ring gear 26. The upper ends of the jaws 77 are pivoted at 79 to the outer ends of levers 80 which are pivotally mounted at 81 on the top of the cover 76. Projecting upwardly from the center of the cover 76 is a screw-threaded stud 82 which passes through an opening 83 formed in a spider that is loosely pivoted at 85 to the inner ends of the levers 80. On the stud 82 is a wing nut 86 which can be screwed down against the link 84 so as to move the link 84 toward the cover 76 and thus operate the levers 80 to pull the ends 78 of the clamping jaws 77 tightly against the gear 26 and force the cover 76 tightly within the flange 52.

The bowl 27 may be constructed from a single casting, but in the preferred construction illustrated in the drawings the gear 26 connects the upper ends of curved arms 89 which radiate outwardly and upwardly from the stud 28. The gear 26, arms 89 and stud may be an integral casting, and seated therein is the hemispherical container 90 which is provided with an external annular shoulder 91 seated upon an annular shoulder 92 of the gear 26. Thus the container 90 may be readily lifted from the gear 26 and arms 89, and to enable the container to stand upright, when detached, said container is provided with legs 93.

The sections of the frame 17 are prevented from relative lateral shifting by studs 94 projecting from the upper section into a socket 95 in the lower section as shown in Fig. 5, and it may be necessary in some instances to prevent lifting of the cover from the bowl 27 and, therefore, thumb-screws 96 are provided in the lower frame section adjacent two of the sockets 95 to engage the studs 94 engaging said sockets.

To prevent relative turning of the gear 26 and container 90, said container is provided with an outwardly projecting lug 97 which seats in a notch 98 in the inner face of said gear.

It is understood that suitable means will be provided to hold the case 62 against turning about the stud 63, and to definitely position the case so that its longitudinal axis is exactly normal with the shaft, and for this purpose the portion 99 of the stud 63 is rectangular in cross section so as to fit the hole 64 which is also rectangular.

From the foregoing, it will be readily apprehended that to effect various operations of which the machine is capable, the appropriate instrumentality 55, 61, 67 or 68 will be placed on the shaft 20 and the flywheel 33 turned, and that a compound motion is produced on the contents of the drum by reason of the crossing of the planes of rotation of the chamber 54 and whatever mixing, kneading, mashing, stirring, beating or whipping unit is being used.

The material while thus being treated in the chamber 54 may at the same time be heated, or cooked by lighting the fuel at the burner 31. When cooking, and especially pressure cooking, is to be effected, without rotation of the bowl or use of any of the instrumentalities mountable on the shaft 20, the upper section of the frame, the cover 50, the flywheel, the shaft and the gears will be removed and the cover 76 will be secured in place as hereinbefore described. The fuel will then be ignited at the burner 31. The cover 76 may be provided with a steam gage and a safety valve, if desired, but these devices are so well known in this art that it is not deemed necessary to illustrate and describe them.

I claim:

1. In a machine of the character described, the combination of a rotatably mounted bowl, a cover for the bowl, the bowl and cover together forming a spherical chamber, a beating and stirring element mounted to rotate within the chamber in a plane crossing the plane of rotation of the bowl, and means to simultaneously operate the beating and stirring element and the bowl, said means including a demountable shaft on which the beating and stirring element is detachably mounted and a set screw to secure said element to the shaft.

2. In a machine of the character described, the combination of outwardly and upwardly curved arms joined at their lower ends and rotatably mounted, a hemispherical container removably seated in the arms, a utensil mounted to rotate within the container in a plane crossing the plane of rotation of the container, means to simultaneously operate the utensil and bowl, and means to prevent relative rotation between the arms and the bowl.

3. In a machine of the character described, the combination of outwardly and upwardly curved arms joined at their lower ends, a hemispherical container removably seated in the arms, a utensil mounted to rotate within the container, means to operate the utensil, and legs on the container.

4. In a machine of the character described, the combination of a step bearing, a shaft journaled in the bearing, upwardly and outwardly curved arms carried by the shaft, a hemispherical container removably seated in the arms, standards provided with bearing sections, other bearing sections detachably secured to the first bearing sections, a shaft extending across the top of the container and journaled in the bearing sections, a utensil mounted on the shaft, and means to simultaneously rotate the shaft and the arms.

5. In a machine of the character described, the combination of a hemispherical bowl, standards provided at their upper ends with bearing sections, a shaft extending across the top of the bowl and removably journaled in said bearing sections, a cover for the bowl, other bearing sections on the cover registering with the first bearing sections, means to turn the shaft, and a utensil mounted on the shaft and adapted to project into the bowl.

6. In a machine of the character described, the combination of a hemispherical bowl, standards provided at their upper ends with bearing sections, a shaft extending across the top of the bowl and removably journaled in said bearing sections, a cover for the bowl, other bearing sections on the cover registering with the first bearing sections, means detachably connecting the first and second bearing sections, means to turn the shaft, and a utensil on the shaft adapted to project into the bowl when the shaft is turned.

7. In a machine of the character described, the combination of a hemispherical bowl, standards provided at their upper ends with bearing sections, a shaft section extending across the top of the bowl and removably journaled in said bearing sections, a cover for the bowl, other bearing sections registering with the first bearing sections, a utensil on the shaft adapted to project into the bowl when the shaft is turned, a spur gear on said shaft section, a second shaft section, a stud connected with the cover, means to detachably connect the second shaft section to either the stud or the first shaft section, a spur gear adapted to be journaled on the stud and to mesh with the first spur gear, operating means on the second shaft section, and means to detachably connect the operating means to either the first or second spur gear.

8. In a machine of the character described, the combination of a rotatably mounted hemispherical bowl, standards provided at their upper ends with bearing sections, a shaft section extending across the top of the bowl and removably journaled in said bearing sections, a cover for the bowl, other bearing sections registering with the first bearing sections, a utensil on the shaft adapted to project into the bowl when the shaft is turned, a ring spur gear on the bowl, a second spur gear rotatably mounted on one of the standards and engaging the ring spur gear, a bevel gear connected with the second spur gear, a second bevel gear on said shaft section engaging the first bevel gear, a third spur gear connected with the second bevel gear, a second shaft section, a stud connected with the cover, means to detachably connect the second shaft section to either the stud or the first shaft section, a fourth spur gear adapted to be journaled on the stud and to mesh with the third spur gear, operating means on the second shaft section, and means to detachably connect the operating means to either the third or fourth spur gear.

Signed at Los Angeles, California this 12th day of October 1921.

LUCIEN HEISER.

Witnesses:
GEORGE H. HILES,
L. BELLE WEAVER.